Oct. 20, 1942. H. F. GADE 2,299,085
SELF-LOCKING NUT
Filed May 16, 1941
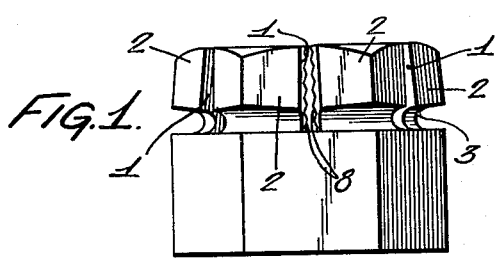
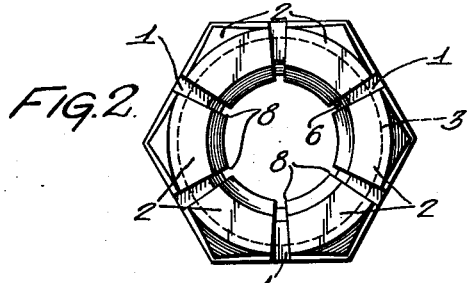
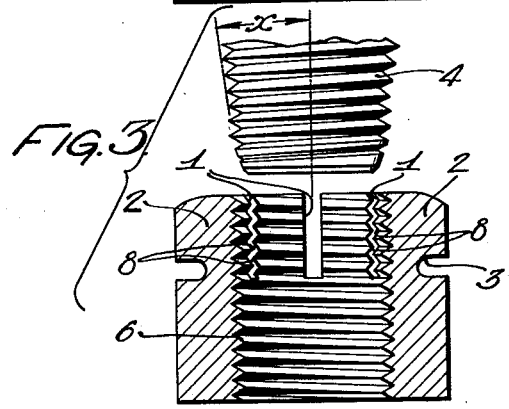
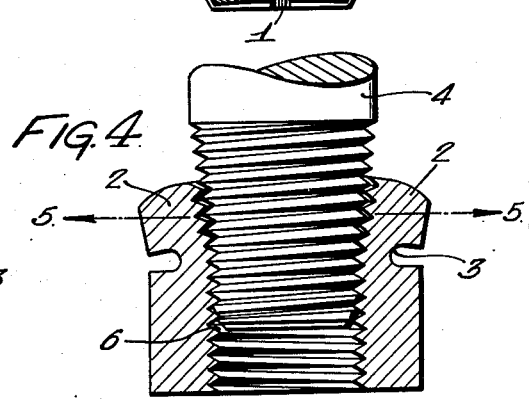
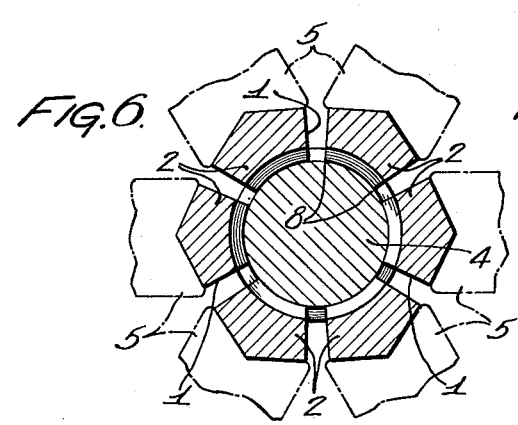
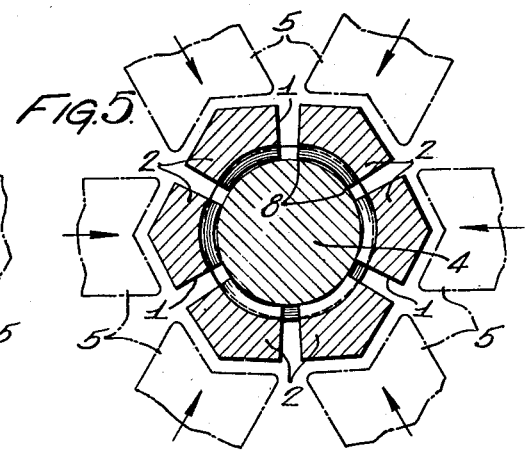
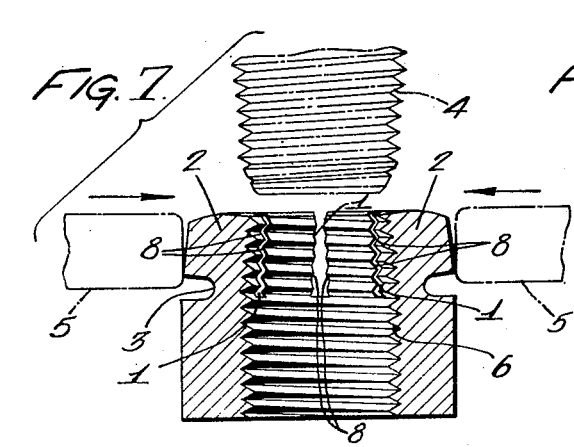
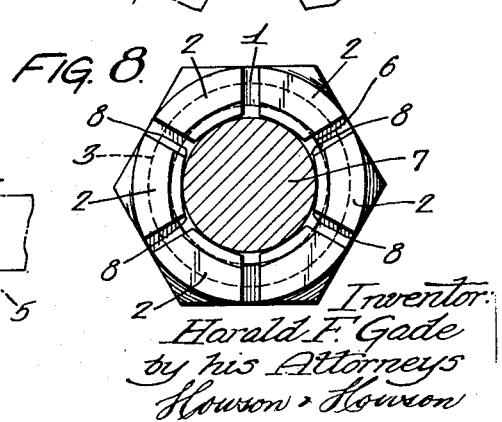
Inventor:
Harold F. Gade
by his Attorneys
Howson & Howson Patented Oct. 20, 1942

2,299,085

UNITED STATES PATENT OFFICE 2,299,085

SELF-LOCKING NUT

Harald F. Gade, Philadelphia, Pa., assignor to Pennsylvania Manufacturing Company, Jenkintown, Pa., a corporation of Delaware Application May 16, 1941, Serial No. 393,824

2 Claims. (Cl. 10—86)

This invention relates to improvements in self-locking nuts of the type wherein the locking function is performed by a segmental portion or portions at one end of the nut, said portion or portions being so formed as to constrict the normal bore of the nut and being resiliently displaceable in the radial direction, so that when the nut is threaded onto its companion bolt, the said segments will bear resiliently upon the bolt and will thereby create the additional friction required to lock the nut in place. Commonly, these nuts are formed at one end with a plurality of slots which define the sides of the aforesaid segmental portions. It has been found that the inner edges of the segments have a scraping action on the threads of the bolt which is objectionable, particularly in the case of bolts which are cadmium-plated for the purpose of preventing corrosion. Such cadmium-plated bolts are widely used, for example, in the aeroplane industry, where corrosion must be avoided, and the aforesaid scraping action of the edges of the resilient segmental locking portions tends to remove the cadmium and expose the ferrous metal to the atmosphere. In other respects, this particular type of self-locking nut is highly efficient, and the present invention contemplates the provision of a nut of this type wherein the inner longitudinal edges of the locking segments shall be freed from scraping contact with the bolt.

More specifically, an object of the invention is to form the nut in such manner that the aforesaid inner edges of the locking segments shall be sufficiently remote to the opposed surfaces of the bolt to avoid scraping contact, while at the same time the said segments will have the frictional engagement with the bolt surfaces required for the locking function.

Another and more general object of the invention is to provide a nut of the type described which shall be generally more efficient than the nuts of the prior art.

Still another object of the invention is to provide a practical and economical method of forming the nut in a manner to produce the aforesaid desirable results.

In the attached drawing:

Figure 1 is a side elevational view of a nut made in accordance with my invention;

Fig. 2 is a plan view of the nut shown in Fig. 1;

Figs. 3 and 4 are vertical sectional views illustrating successive steps in the process of manufacture;

Figs. 5 and 6 are sectional views on the line 5—5, Fig. 4, illustrating further steps in the process of manufacture;

Fig. 7 is a vertical sectional view illustrating a final step in the manufacturing procedure, and Fig. 8 is a top plan view of the nut assembled on the bolt and illustrating the structural characteristics of the finished product.

With reference to the drawing, the nut therein illustrated as an embodiment of my invention comprises a plurality of slots 1 which form at the outer end of the nut a plurality of segmental portions 2. Preferably the nut is provided at the inner ends of the segments 2 with an external annular groove 3 which reduces the thickness of the wall at this point, so that in effect the segments are joined to the body of the nut by a relatively narrow section of metal. In forming this nut, a blank of conventional form may be used, the blank being grooved and then internally threaded in the usual manner, and subsequently slotted to produce the form described above. The nut in this stage of formation is illustrated in the sectional view of Fig. 3.

In accordance with my invention, I now thread into the upper slotted end of the nut a tapered expanding plug 4, see Fig. 3, which as shown in Fig. 4 has the effect of outwardly radially deflecting the segmental portions 2. Since in transverse section the inner surfaces of the segments 2 describe arcs of a circle of smaller radius than the tapered portion of the expanding plug, the segments 2, when expanded, will bear against the plug only at their side edges, as illustrated in Fig. 5. With the expanding plug in place and as illustrated in Figs. 4 and 5, the segments are now subjected externally to radial compression against the surface of the plug, by means, for example, of compression elements 5, with the result that the inner threaded surfaces of the segments are made to conform in curvature to the curvature of the plug. Preferably, the form of the compression members 5 is such as to retain the normal outer contours of the segments so that the distortion of the metal is confined entirely to the inner portions.

The expanding plug 4 is now removed from the nut and, as shown in Fig. 7, the pressure elements 5 again advanced to press the segmental portions 2 radially inward to such an extent that the inner surfaces of the segments converge into the normal bore 6 of the nut and are permanently set in this position, the said bore being thereby somewhat restricted at the outer end of the nut as illustrated.

When now the nut is threaded on the companion bolt, as illustrated in Fig. 8, wherein the bolt is indicated by the reference numeral 7, the segmental portions 2 will bear resiliently against the sides of the bolt. By reason of the fact, however, that curvature of the inner faces of the segments 2 is less acute than that of the bolt, the side edges 8 of the segments are relieved from close contact with the opposed bolt surfaces, with the result that the aforesaid objectionable scraping or abrading action is avoided. This is illustrated in Fig. 8. By reason of the fact that the thread of the nut is formed by a straight tap while the segments are in alignment with the body of the nut, the threads on the segments will conform to the normal pitch, and this condition will prevail when the finished nut is threaded onto the bolt and the segments are thereby forced outwardly substantially into alignment with the body.

It will be noted that at the inner ends of the segments 2 on the line where they join the normal body of the nut, the radius of curvature of the inner faces of the segments is substantially the same as that of the normal bore 6. From this line outwardly the radius of curvature gradually increases to a maximum at the outer ends of the segments. Thus, throughout the height of the segments, as defined by the depth of the slits 1, the longitudinal edges 8 of the segments are more remote to the axis of the bore 6 than the intervening areas of the curved inner surfaces of the segments. These surfaces in any transverse plane approach closest to the said axis at their mid areas, in which areas they lie substantially in tangential relation to a circle centering in said axis and somewhat smaller in radius than the circle defined by the normal bore.

It will be understood that the clearances shown in the drawing are exaggerated for the purpose of illustration. A taper slightly in excess of 1° in the threaded plug, as measured by the angle $x$ in Fig. 3, or in other words, an included angle of taper of slightly more than 2° will be found generally satisfactory, although the degree of taper may be varied as required. In general, it is desirable to employ the smallest taper that will adequately relieve the edges of the segment from the bolt surfaces. In the finished product, the gripping or locking force will depend in part upon the depth of the annular recess 3 and in part upon the extent to which the locking segments are displaced inwardly toward the axis of the bore. Obviously these factors will depend upon the size of the nut, the composition and characteristics of the metal stock, and the conditions under which the nut is to be used. In most instances, the recess 3 should be of substantial depth in order to afford a proper degree of resilience in the segments.

I claim:

1. The method of manufacture, which consists of slotting a threaded nut blank to provide at one end thereof a plurality of segmental portions forming continuations of the solid wall of the nut, threading a tapered plug into the slotted end of the nut to radially spread said segments, applying pressure inwardly against said segments to cause the inner faces thereof to conform with the curvature of said plug, removing the plug, and subsequenttly inwardly displacing said segments to cause the inner surfaces thereof to converge toward the axis and to constrict the normal bore of the nut.

2. The method of manufacture, which consists of slotting a threaded nut blank to provide at one end thereof a plurality of segmental portions forming continuations of the solid wall of the nut, performing work upon said segmental portions to increase the radius of curvature thereof, and subsequently inwardly displacing said segments to cause the inner surfaces thereof to converge toward the axis and to constrict the normal bore of the nut.

HARALD F. GADE.